United States Patent
Turner et al.

(10) Patent No.: US 7,392,701 B2
(45) Date of Patent: Jul. 1, 2008

(54) BALANCING MACHINE

(76) Inventors: William F. Turner, deceased, late of Burnet TX (US); by Judith Ann Turner, legal representative, 145 Rocky Ridge Dr., Burnet, TX (US) 78611; Warren K. Turner, 149 Rocky Ridge Dr., Burnet, TX (US) 78611

( * ) Notice: Subject to any disclaimer, the term of this patent is extended or adjusted under 35 U.S.C. 154(b) by 542 days.

(21) Appl. No.: 10/752,272

(22) Filed: Jan. 6, 2004

(65) Prior Publication Data
US 2006/0130576 A1    Jun. 22, 2006

(51) Int. Cl.
*G01M 1/16*    (2006.01)
(52) U.S. Cl. ............................ 73/462; 66/468
(58) Field of Classification Search ........ 73/462, 73/460, 468, 473, 475, 476, 477, 466, 487, 73/461, 66
See application file for complete search history.

(56) References Cited

U.S. PATENT DOCUMENTS

| | | | | |
|---|---|---|---|---|
| 3,090,237 A | 5/1963 | Ongaro | | 73/462 |
| 3,122,020 A | 2/1964 | Hack | | 73/462 |
| 3,336,809 A * | 8/1967 | Hack | | 73/462 |
| 3,572,620 A | 3/1971 | Kincaid | | 248/17 |
| 3,698,139 A * | 10/1972 | Everett | | 451/8 |
| 3,805,624 A | 4/1974 | Martin | | 73/462 |
| 3,895,536 A | 7/1975 | Behm | | 73/462 |
| 4,046,017 A | 9/1977 | Hill | | 73/462 |
| 4,062,242 A | 12/1977 | Brihier | | 73/462 |
| 4,352,291 A * | 10/1982 | Curchod et al. | | 73/462 |
| 4,545,247 A | 10/1985 | Wilson et al. | | 73/473 |
| 4,712,425 A | 12/1987 | Augendre et al. | | 73/460 |
| 4,741,210 A * | 5/1988 | Maus | | 73/462 |
| 4,852,405 A | 8/1989 | Schonfeld | | 73/461 |
| 4,958,290 A * | 9/1990 | Kendall et al. | | 73/460 |
| 5,046,361 A | 9/1991 | Sandstrom | | 73/460 |
| 5,058,429 A * | 10/1991 | Fietzke et al. | | 73/475 |
| 5,505,083 A | 4/1996 | Hines et al. | | 73/462 |
| 5,603,148 A * | 2/1997 | Hjorth-Hansen | | 29/33 R |
| 5,615,574 A * | 4/1997 | Drechsler et al. | | 73/487 |
| 6,065,338 A | 5/2000 | Stoiber et al. | | 73/462 |
| 6,250,155 B1 * | 6/2001 | Hormann et al. | | 73/462 |
| 6,293,146 B1 | 9/2001 | Jin | | 73/462 |
| 6,422,074 B1 * | 7/2002 | Colarelli et al. | | 73/462 |
| 6,690,982 B1 * | 2/2004 | Fujishima et al. | | 700/99 |
| 6,694,812 B2 * | 2/2004 | Loetzner et al. | | 73/462 |
| 6,799,470 B2 * | 10/2004 | Harada | | 73/774 |
| 6,901,798 B2 * | 6/2005 | Trionfetti | | 73/462 |
| 2005/0210976 A1 * | 9/2005 | Gerdes et al. | | 73/459 |

* cited by examiner

*Primary Examiner*—Hezron E. Williams
*Assistant Examiner*—Jacques M. Saint-Surin
(74) *Attorney, Agent, or Firm*—Fish & Richardson P.C.; Kelly K. Kordzik

(57) ABSTRACT

An improved and simplified balancing machine comprising upright supports devices to hold the workpiece to be balanced, a motor and mount to spin the workpiece, and a system to detect and measure imbalance in the workpiece when it is rotated at speed. Said machine configured to be attached to a machine tool or work table without losing functional integrity, thereby eliminating the need for a massive base. Specific preferred structural embodiments are disclosed.

10 Claims, 8 Drawing Sheets

SOFTWARE PROGRAM FOR PERSONAL COMPUTER
BLOCK DIAGRAM FLOW CHART

BALANCING MACHINE

FIELD OF THE INVENTION

The invention relates to a machine for detecting and measuring rotational imbalance of mechanical components. More particularly, this invention relates to an improvement in balancing machine technology through a more simplified design which eliminates the need of certain components.

DESCRIPTION OF THE PRIOR ART

Prior art in balancing machines consist of large free standing machines. They incorporate a massive base, support devices to hold the workpiece to be balanced, a motor mounted in said base to spin said workpiece, and a system to detect and measure imbalance in said workpiece when it is rotated at speed. One type of balancing machine requires that said workpiece be removed from the balancer in order that said workpiece be drilled, ground or otherwise brought into a dynamically balanced state. Other types of these machines are so large that a milling/drilling machine is mounted on said massive base, allowing said milling/drilling machine to be rolled into position over the point of imbalance thereby drilling said workpiece to remove material from the point of imbalance. In this example, said workpiece is not removed from the machine until the balancing is completed. This method works well. In order to achieve this, however, the machine was massive, expensive, and dedicated in its application. Many small businesses can afford neither the purchase price nor the dedicated floor space for these machines. FIG. 9 of the appended drawings shows an example of this type of balancing machine.

A pre-examination search found the following United States patents which are illustrative of the types of prior art devices that have been known.

- U.S. Pat. No. 3,871,234; C. Langlois describes a dedicated balancing machine of rather complex mechanical nature requiring a special base.
- U.S. Pat. No. 4,406,164; G. Hines describes a dedicated balancing machine requiring a massive base and the drive motor mounted in said base below the part to be balanced. This prior art is represented by FIG. 6 of the appended drawings.
- U.S. Pat. No. 4,556,346; G. Hines describes a dedicated balancing machine requiring a massive base and the drive motor mounted in said base below the part to be balanced. This patent claims the apparatus for mounting a drill press on said base. This prior art is represented by FIG. 6 of the appended drawings.
- U.S. Pat. No. 5,199,992; G. Hines describes a dedicated balancing machine with correction apparatus for applying and hardening a viscous material on the workpiece. This unit also requires a massive specially designed base.
- U.S. Pat. No. 5,505,083; G. Hines describes a dedicated balancing machine with correction apparatus operating in a split station mode with a workpiece transport module. This unit also requires a massive specially designed base.
- Des. 320,214 G. Hines claims a design patent on his massive dedicated base.

The foregoing prior art, which generally describe the current commercially available balancing machines clearly show a consistent use of large, heavy, dedicated machine bases. As can be seen from discussion of this prior art and the following disclosure this invention, the prior art has not provided a balancing machine having the features hereinafter described.

SUMMARY OF THE INVENTION

Accordingly, it is the object of this invention to provide a new and improved device whose purpose is to detect and measure rotational imbalance in mechanical components, retaining all the functions of the prior art while eliminating certain features which require increased size, weight, and cost, thereby demonstrating that a relatively small, light weight, and lower cost machine can function equally as compared to the existing art in this field of application. The lower cost will increase the availability of these machines to smaller companies. The small size and lighter weight will allow shipment by parcel services rather than by motor freight thereby increasing the portability of the unit.

More particularly, it is the object of this invention to provide a balancing machine for automotive engine crankshafts and obviate the disadvantages of the prior art.

These and other objects will become apparent from the descriptive matter provided hereinafter, particularly when taken into conjunction with the appended drawings.

In accordance with this invention, there is provided a balancing machine comprising:
- A. support devices to hold the workpiece to be balanced;
- B. a motor and mount to spin said workpiece;
- C. a system to detect and measure imbalance in said workpiece when it is rotated at speed.

In my preferred embodiment, there is no massive base. This machine is configured as an attachment to the milling/drilling machine. The mass of the milling machine is used as the base for the balancer with portions of the balancing machine mounted to the machine table, specifically the support devices with sensors, the motor mount/belt tensioner unit, and the rotary position sensor. Rather than the method used in prior art, moving the milling/drilling machine to the location of imbalance and securing said machine in position for drilling or milling, the table of the milling machine is moved, usually with a hand crank, thereby positioning the workpiece under the spindle of the milling machine. The movement of the mill table with balancer and workpiece attached is simpler and more precise as compared to the method of operation in prior art. The new design also lends itself to computer controlled automation of the process where a computer controlled milling/drilling machine, with the attached invention, could be used for automatic positioning and drilling.

DESCRIPTION OF THE PREFERRED EMBODIMENT

Figure 6:
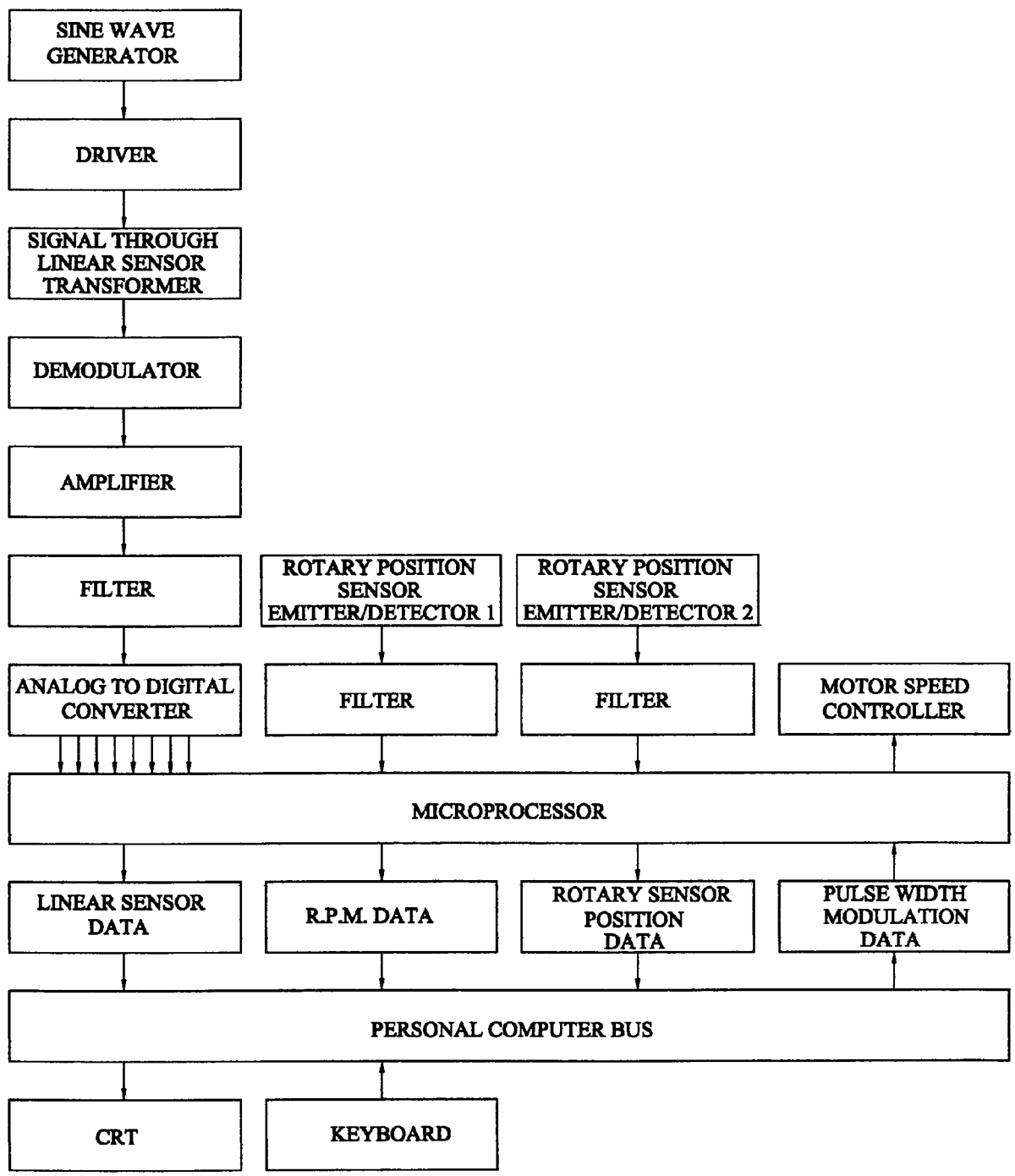
FIG. 6 is a block diagram flow chart of the adapter card for personal computer.

While it is to be borne in mind that this invention can be attached to different types of machine tools and configured for balancing many different mechanical components, one of the areas where it finds usefulness is in the balancing of automotive crankshafts. Many small engine shops can not afford the purchase price and the floor space required by the large units that are now commercially available. In the preferred embodiment, the invention is uniquely advantageous when configured as an attachment to a vertical milling machine of the type frequently already owned by these shops. If the purchase of a milling machine is necessary, the mill is not permanently dedicated to balancing. The balancing machine can be easily removed from the mill, leaving it fully functional for other work. It should also be noted that the combined purchase price of the milling machine and the balancing machine is less than the cost of a dedicated balancing machine as shown in FIG. 6. Accordingly, it is in this environment that this invention will be described hereinafter.

Figure 1:
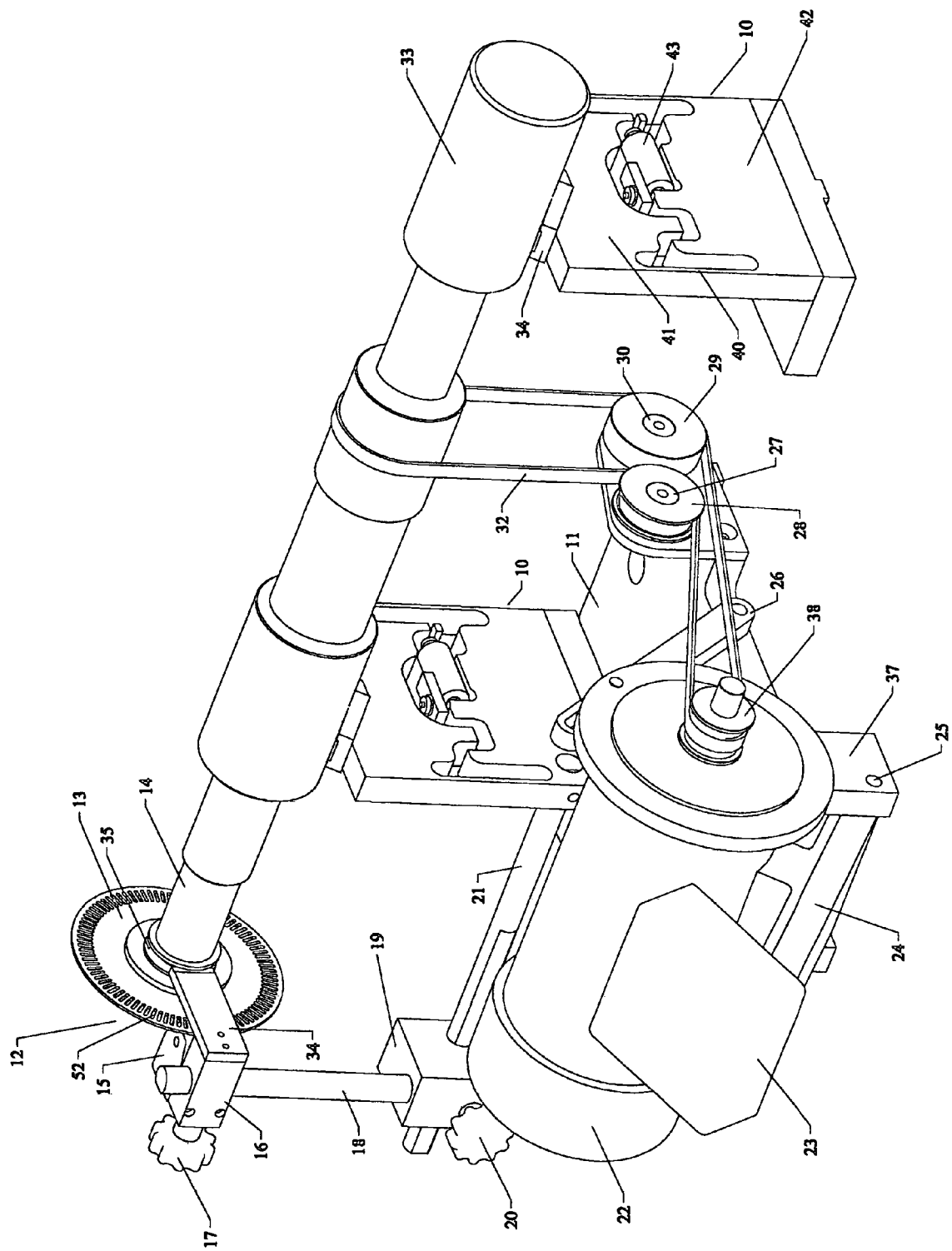
FIG. 1 is an isometric view of the balancing machine with a workpiece in position to be spun and measured for dynamic balance. The cover plates are removed from this view of the upright supports in order to show the configuration of said upright supports and the linear displacement sensors.
Figure 2:
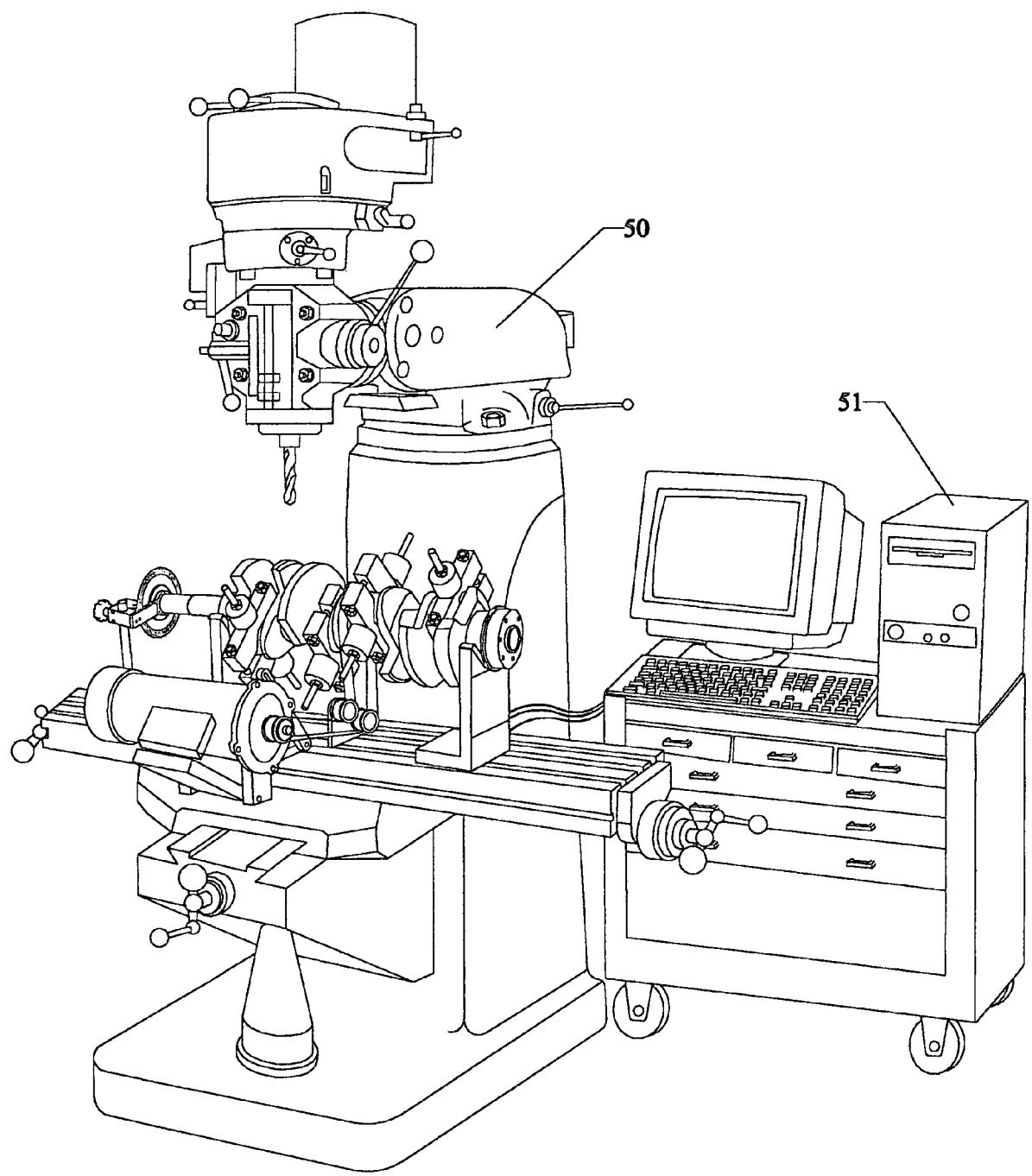
FIG. 2 is an isometric view the invention configured as an attachment to a conventional vertical milling machine. It shows the balancing machine attached to the milling machine table. An automotive crankshaft with attached weights is in position on the balancer. A computer is connected to the balancing machine.
Figure 3:
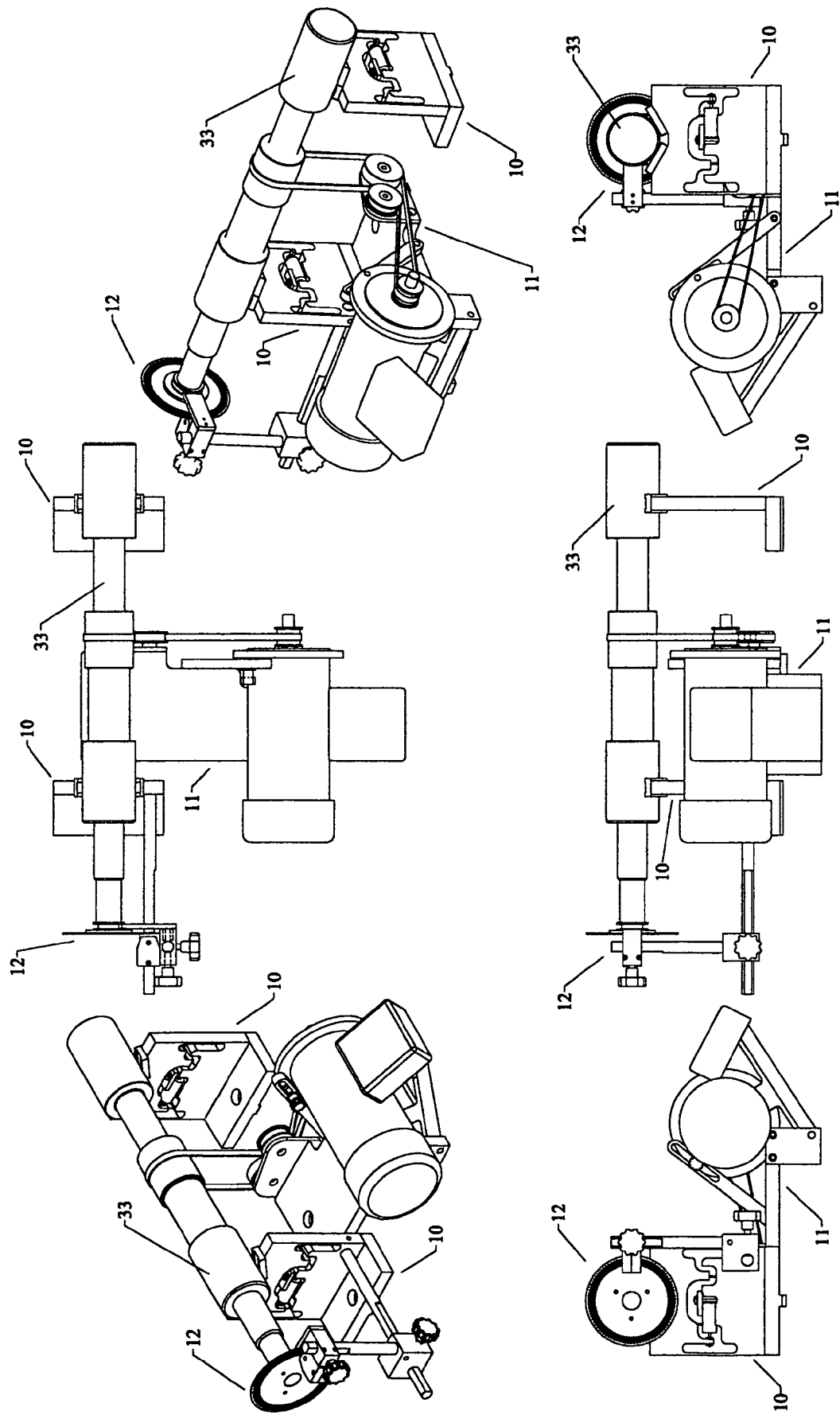
FIG. 3 is a combination of isometric views with orthographic top, front, left, and right sides showing the same configuration as FIG. 1.
Figure 7:
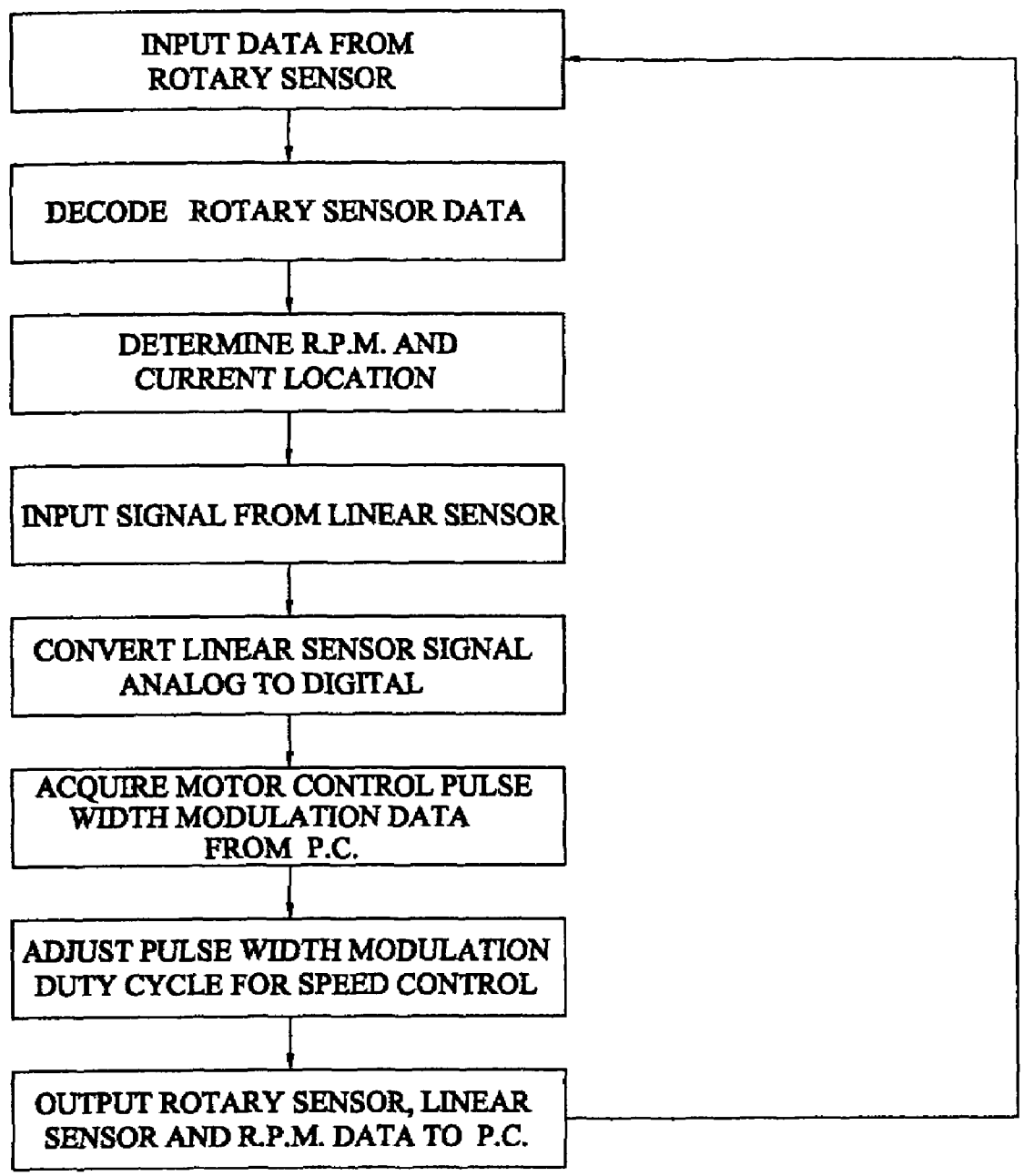
FIG. 7 is a block diagram flow chart of the microprocessor program.
Figure 8:
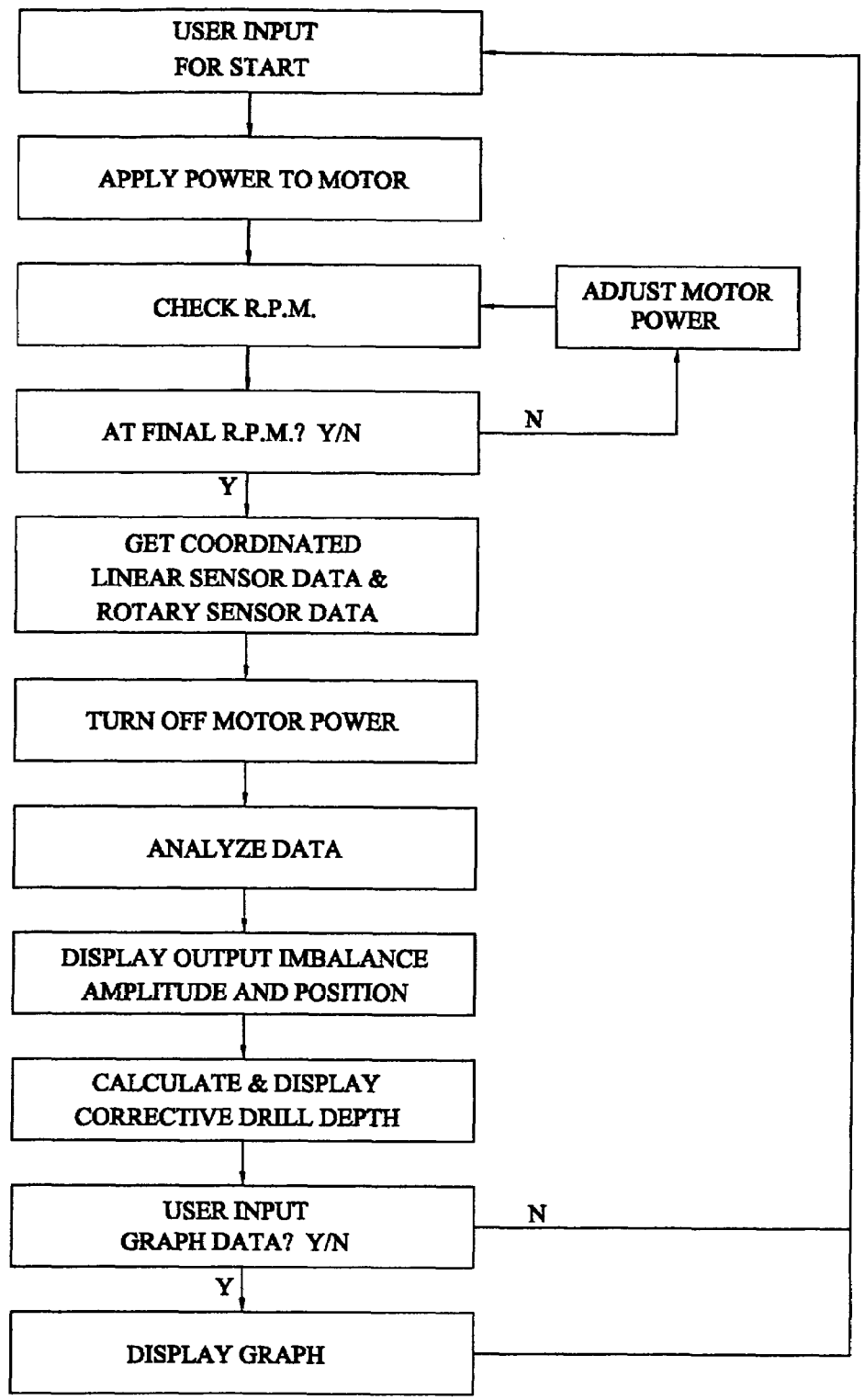
FIG. 8 is a block diagram flow chart of the software program for personal computer.
Figure 9:
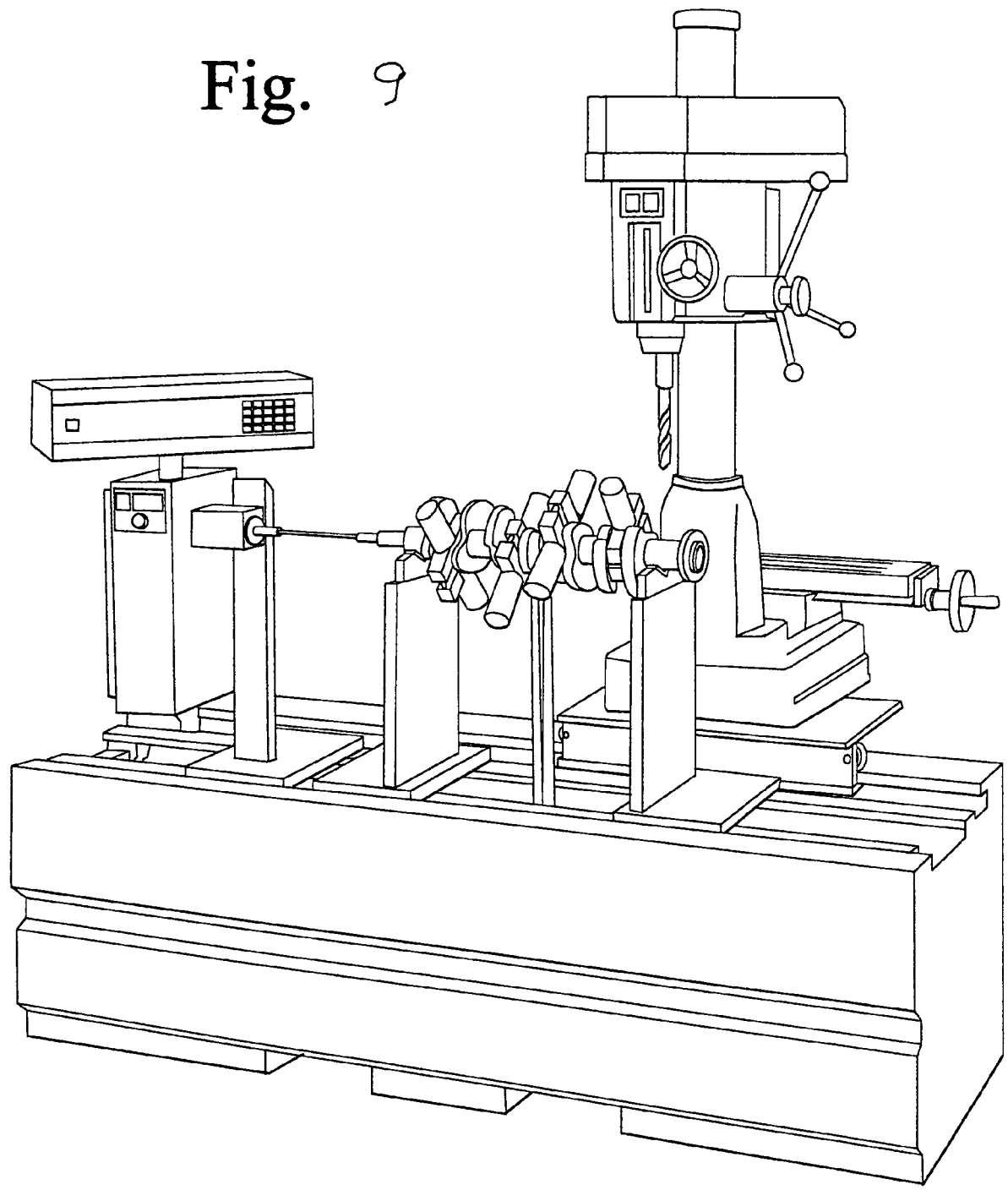
FIG. 9 is an isometric view of commercially available prior art.

Referring to FIG. 1, the workpiece 33 to be measured for dynamic balance is supported in v-block bearings 39 of at least two upright supports 10 while rotated by motor 22 by means of a belt 32 communicating pulleys 38, 28, and 29 and said workpiece 33. Said motor 22 and motor controller assembly 23 are rigidly attached to motor plate 24 which pivotally attaches to hinge tabs 37 through hinge pin 25. Said hinge tabs 37 being rigidly attached to motor base 11. Pulleys 29 and 28 are positioned by axle shafts 30 and 27 being rigidly attached to said motor base 11 in such a way as to align said belt 32 substantially vertical as it engages the workpiece 33. This pulley arrangement allows a front mounted motor 22 while not inducing horizontal thrust to said workpiece 33 during the application of torque for rotation. A belt tensioning arm 26 secures said motor 22 in position to assure proper tension of said belt 32. During rotation at speed, typically 200 to 700 revolutions per minute, said workpiece 33 is restrained from vertical movement by the v-block bearings 34 and the tension of said belt 32. The horizontal component of the dynamic imbalance thrust is transmitted from workpiece 33 through said v-block bearings 34 to the upper portion 41 of said upright support 10. Said thrust causes flexing of the thin vertical area 40 resulting in a substantially horizontal movement of upper portion 41 relative to lower portion 42 of said upright support 10, said lower portion 42 being rigidly affixed to a machine tool 50 (FIG. 2). Relative horizontal deflection between said upper portion 41 and said lower portion 42 is detected and measured by a linear sensor 43 (commercially known as a Linear Variable Differential Transformer) mounted in upright support 10. Details of this construction and function will be descried further in detailed descriptive matter hereinafter. Rotational data is created by an optical sensor assembly 12 comprising, optical sensor head 15 attached to mounting block 16, slideably communicating with vertical rod 18 and secured at proper vertical location by hand screw 17, said vertical rod 18 being rigidly affixed to block 19, slideably communicating with horizontal rod 21 and secured at the proper horizontal position by hand screw 20, said horizontal rod 21 being rigidly connected to upright support 10. The optical sensor head 15 detects rotation of slotted sensor wheel 13. The sensor wheel 13 is attached to workpiece 33 coaxially by adapter hub 14 and rotates as an assembly. Rotational data from sensor head 13 is sent to a computer 51 (FIG. 2) and used for speed control and angular position location of workpiece 33. When the data from rotary sensor head 15 and data from linear sensors 43 are analyzed by the computer 51 (FIG. 2) the amount of imbalance, the position of said imbalance, and the required corrective drill depth/location can be determined. This, of course, requires the proper computer interface card and computer program as described in FIG. 6, FIG. 7, and FIG. 8. Further referring to FIG. 1, there is also provided a means of limiting the axial movement of workpiece 33. Adapter hub 14 is configured with a groove 35 around the circumference which engages with semi-flexible thrust control plate 34. Said thrust control plate 34 is rigidly attached to block 16. There is provided a slight running clearance between the sides of said groove 35 in adapter hub 14 and thrust control plate 34. This configuration of thrust control results in substantially all frictional forces existing in the vertical direction, with almost no horizontal force component which would affect the output of said linear sensors 43. It should also be noted that said optical sensor 15 does not contact sensor wheel 13, thereby isolating any forces, frictional or otherwise, from the rotating workpiece to be measured for dynamic balance.

Figure 5:
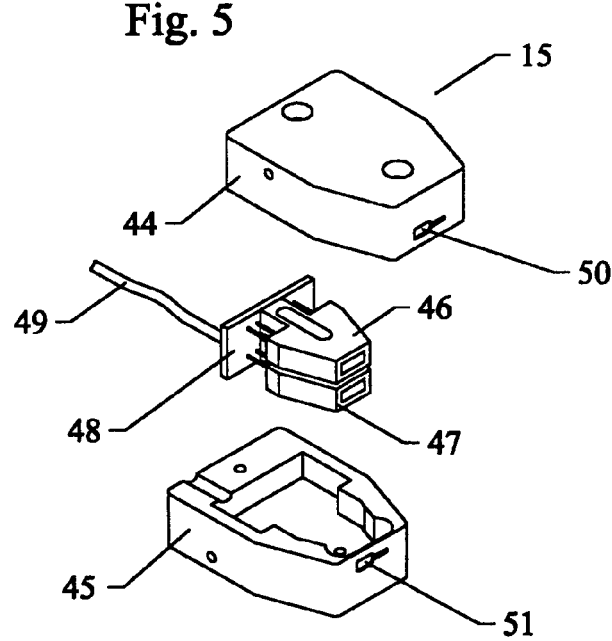
FIG. 5 is a close up view of the optical sensor case and internal components.

Referring to FIG. 5, the optical sensor head 15 comprising of upper and lower case halves 44 and 45, two standard commercially available optical emitter/detector sensors 46 and 47 mounted on a custom printed circuit board 48 and a cable 49 which connects to the computer. Said sensors 46 and 47 and board 48 are affixed inside said upper and lower case halves 44 and 45 so that apertures 50 and 51 align optically with sensors 46 and 47 and provide a masking effect for the proper width of detection. The vertical spacing between sensors 46 and 47, as further restrictively established by apertures 50 and 51, equals one and three quarters the circumferential spacing of the slots 52 in sensor wheel 13. This offset spacing allows for both finer resolution of rotational position and data for determining the direction of workpiece rotation as said sensors 46 and 47 detect the change of reflectivity during rotation of sensor wheel 13, alternately exposing either polished metal of sensor wheel 13 or slots 52 to said sensors 46 and 47.

Figure 4:
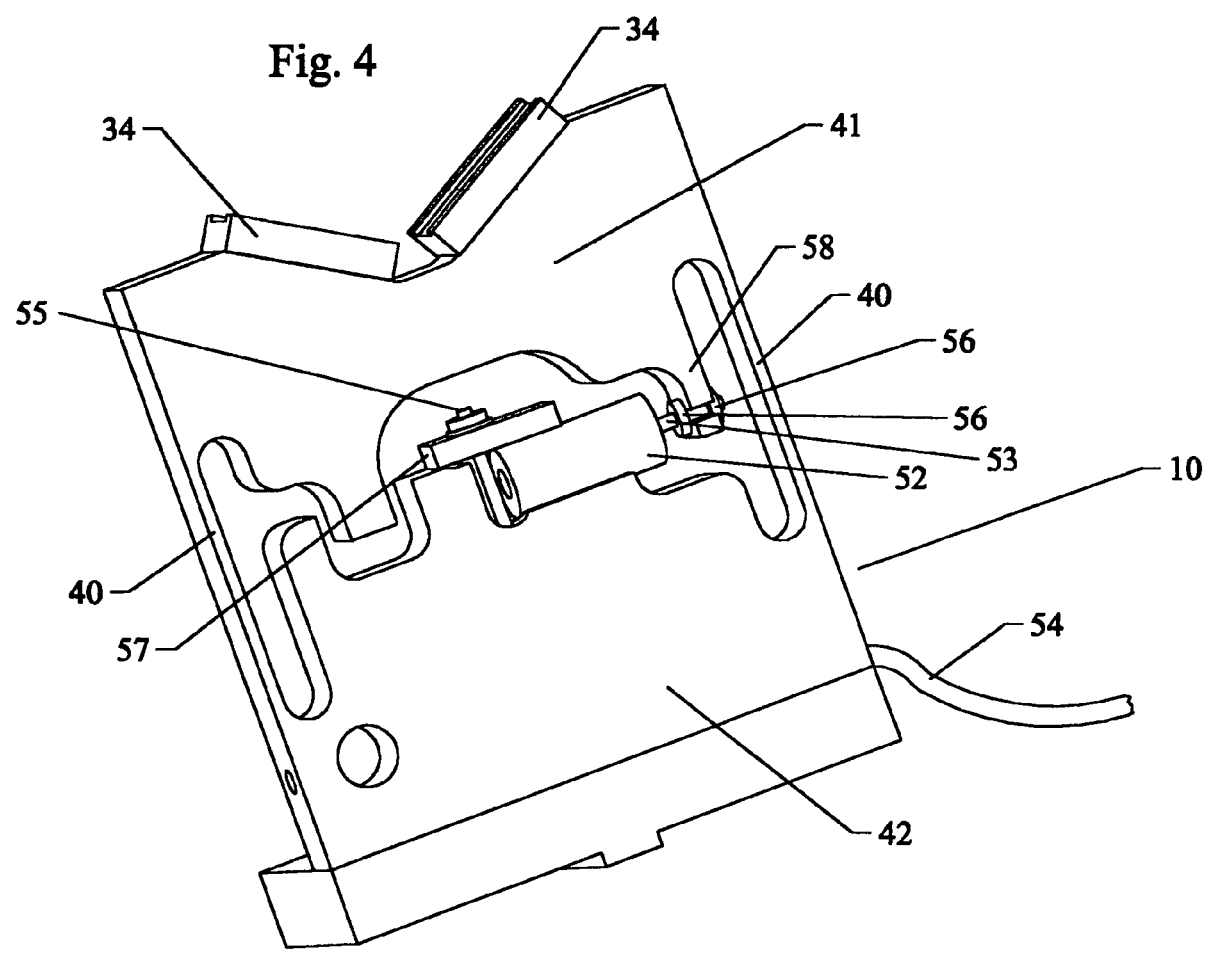
FIG. 4 is a close up isometric view of the upright support. The cover plates are removed from this view of the upright support in order to show the configuration of said upright support and the linear displacement sensor.

Referring to FIG. 4, the linear sensor 43 consist of body 52, core 53, and cable 54. Said body 52 is rigidly clamped onto lower portion 42 of upright support 10 by clamp 57 and clamp screw/nut 55. Said core 53 is rigidly held in slotted protrusion 58 of upper portion 41 by threaded nuts 56.

Said core 53 is axially aligned to body 52. Cable 54 of sensor 43 is routed through passages in upright support 10, exiting at the rear of said upright support 10 and connecting to computer 51 (FIG. 2). As upper portion 41 of upright support 10 moves relative to lower portion 42 through the flexing of portions 40, said core 53 is moved inside body 52 of linear sensor 43. This change of position creates a change in the electrical output of said sensor 43 which can be deciphered by computer 51 (FIG. 2) as a force of imbalance when combined with rotational data.

In operation, upon computer entered command, the computer causes the motor to accelerate at a controlled rate to a predetermined rotational speed. The workpiece to be measured for dynamic balance is, in turn rotated by a belt communicating workpiece and motor through pulleys. As the workpiece rotates, electronic sensors provide coordinated data of rotation position and linear displacement due to any imbalance. This data is filtered and analyzed by the computer hardware and software. The computer then outputs the rotational imbalance data in the form of a maximum amount with angular location for each upright support. A graph of all data is also computed an output to the screen. The computer also calculates and provides the suggested depth to spot drill the workpiece in order to bring said workpiece into dynamic balance. In some instances multiple operations of spinning, measuring, and drilling are necessary.

Although this invention has been described with a certain degree of particularity, specifically referencing crankshaft balancing as the application, this reference is given only as example and does not limit the application to a specific use. While the preferred embodiment was described as mounted to a vertical milling machine, the invention can be mounted to any suitable device, including a substantial table or workbench. The invention can be used for many applications and can be configured specifically for other applications without violating the theme of this invention. The invention can even be configured using a single upright with linear sensor in conjunction with a rigid non sensing second support or other bearing support system. While the preferred embodiment demonstrates v-block bearings, it will be evident to those skilled in the art that other bearing arrangements are possible, including roller bearings mounted to the upright supports. While the preferred embodiment also demonstrates linear variable differential transformers for horizontal measurement of forces due to dynamic imbalance, other sensing devices such as strain gauges and load cells can be utilized without deviating from the scope and spirit of this invention.

What is claimed is:

1. A balancing machine for mounting to a machine tool to correct a rotational imbalance of a workpiece comprising:
   a first workpiece support for retaining said workpiece from moving in a first axis direction and allowing said workpiece to rotate while translating in a second axis direction, said first workpiece support having a base section for attaching to a mounting surface on a moveable table of said machine tool, wherein said mounting surface is substantially perpendicular to said first axis direction;
   a second workpiece support for retaining said workpiece from moving in said first axis direction and allowing said workpiece to rotate while translating in said second axis direction, said second support coupled to said base section, wherein said second workpiece support is disposed spaced from said first workpiece support along an axis of rotation of said workpiece; and
   a belt tensioning pulley coupled to said base section for tensioning a drive belt for rotating said workpiece, wherein said belt tensioning pulley directs said drive belt to hold said workpiece in contact with each of said first and second workpiece supports with forces directed substantially in said first axis direction.

2. The balancing machine of claim 1 further comprising a retaining section coupled to said base section for holding said workpiece in a third axial direction substantially perpendicular to said first and second axis directions while exerting substantially zero force on said workpiece in said second axis direction.

3. The balancing machine of claim 2 further comprising a rotational speed sensing device mounted to said retaining section and sensing an encoded wheel coupled to said workpiece thereby measuring a rotational speed of said workpiece.

4. The balancing machine of claim 2 further comprising a rotational position sensing device mounted to said retaining section and sensing an encoded wheel coupled to said workpiece thereby measuring a rotational position of said workpiece.

5. The balancing machine of claim 1 further comprising a rotational prime mover for rotating said workpiece with said drive belt, said rotational prime mover coupled to said base section and disposed away from said first and second workpiece supports substantially in said second axis direction, wherein said prime mover does not interfere with said workpiece and allows access to said workpiece by a machine tool head coupled to said machine tool.

6. A method for correcting a rotational imbalance in a workpiece comprising the steps of:
   axially supporting said workpiece in a balancing machine for rotating said workpiece;
   rotating said workpiece about an axis of rotation with a drive belt tensioned to hold said workpiece in a first axial direction while allowing said workpiece to translate in a second axial direction substantially perpendicular to said first axial direction;
   determining a rotational speed and a rotational position of said workpiece;
   sensing dynamic forces on said workpiece in said second axial direction;
   mounting said balancing machine to a machine tool table, wherein said machine tool table is configured to move in a plane under and substantially perpendicular to a machine tool head adapted to hold a machine tool;
   determining a point of imbalance on said workpiece in response to an analysis of said dynamic forces, said rotational position of said workpiece, and said rotational speed of said workpiece;
   positioning said point of imbalance under said machine tool with said machine tool table; and
   modifying said workpiece with said machine tool to correct said rotational imbalance in said workpiece.

7. A method for correcting a rotational imbalance in a workpiece comprising the steps of:
   mounting an imbalance detection device containing said workpiece to a machine tool table on a machine tool;
   determining a point of imbalance in said workpiece using said imbalance detection device;
   positioning said imbalance detection device containing said workpiece under a tool head on said machine tool using said machine tool table; and
   modifying said workpiece at said point of imbalance using a tool coupled to said tool head.

8. A system for correcting a rotational imbalance in a workpiece comprising:
   an imbalance detection device for determining said rotational imbalance of said workpiece;
   a means for mounting said imbalance detection device containing said workpiece to a machine tool table on a machine tool having a tool head, wherein said machine tool table is operable for locating said workpiece under said tool head; and a tool mounted in said tool head for modifying said workpiece while in said imbalance detection device to correct said rotational imbalance.

9. A system for correcting a rotational imbalance in a workpiece comprising:
   an imbalance detection device for determining a rotational imbalance of said workpiece;
   a means for mounting said imbalance detection device containing said workpiece to a machine tool table on a machine tool having a tool head, wherein said machine tool table is operable for locating said workpiece under said tool head by moving the imbalance detection device in a first and a second direction, said first and second directions perpendicular and in a common plane; and
   a tool mounted in said tool head for modifying said workpiece while in said imbalance detection device, wherein said tool head is configured to rotate said tool while moving said tool in a direction perpendicular to said common plane to contact and remove material from said workpiece to correct said rotational imbalance.

10. The system of claim 9, wherein said machine tool is a milling machine or a drill press.

* * * * *

UNITED STATES PATENT AND TRADEMARK OFFICE
CERTIFICATE OF CORRECTION

PATENT NO. : 7,392,701 B2
APPLICATION NO. : 10/752272
DATED : July 1, 2008
INVENTOR(S) : William F. Turner It is certified that error appears in the above-identified patent and that said Letters Patent is hereby corrected as shown below:

Cover Page: Item [60] Add -- Related U.S. Application Data -- section.

Cover Page: Underneath "Related U.S. Application Data" section add -- Divisional of application no. 09/596,787, filed on June 19, 2000 --.

Signed and Sealed this

Eleventh Day of November, 2008

JON W. DUDAS
*Director of the United States Patent and Trademark Office*